United States Patent [19]

Aoki et al.

[11] Patent Number: 4,881,926
[45] Date of Patent: Nov. 21, 1989

[54] STEPLESS SPEED VARIATOR OF A BELT TYPE

[75] Inventors: Hachiro Aoki; Tadashi Kobayashi; Junya Kuronuma; Hideya Kikuchi, all of Saitama, Japan

[73] Assignee: Diesel Kiki Co., Ltd., Tokyo, Japan

[21] Appl. No.: 277,319

[22] Filed: Nov. 29, 1988

[30] Foreign Application Priority Data

| Dec. 4, 1987 | [JP] | Japan | 62-184385[U] |
| Dec. 4, 1987 | [JP] | Japan | 62-184384[U] |
| Mar. 4, 1988 | [JP] | Japan | 63-28089[U] |
| Mar. 4, 1988 | [JP] | Japan | 63-28090[U] |
| Mar. 4, 1988 | [JP] | Japan | 63-28091[U] |
| Jun. 10, 1988 | [JP] | Japan | 63-141556 |

[51] Int. Cl.$^4$ ............................................. F16H 9/12
[52] U.S. Cl. ......................................... 474/25; 474/13; 474/28
[58] Field of Search .................... 474/8, 11–13, 474/15, 17, 18, 25, 28, 69, 70; 74/866–869

[56] References Cited

U.S. PATENT DOCUMENTS

| 4,406,644 | 9/1983 | Kinbara et al. | 474/13 |
| 4,583,423 | 4/1986 | Hahne | 474/28 X |
| 4,608,032 | 8/1986 | Stockton et al. | 474/28 |
| 4,673,379 | 6/1987 | Ohzono et al. | 474/28 |

Primary Examiner—Thuy M. Bui
Attorney, Agent, or Firm—Henry C. Nields

[57] ABSTRACT

Rotation speed of automotive auxiliary machines is controlled by a drive pulley provided on a crank shaft and a driven pulley communicating with the drive pulley through a V-belt. The drive pulley comprises a rigid pulley secured on a drive shaft, a guide holder to be rotated together with the drive shaft by a mount bolt, and a slide pulley axially-movably located between the guide holder and the rigid pulley. The slide pulley provides a power piston to be moved along a guide holder shaft. The power piston, the guide holder flange, and the slide pulley define a power piston chamber.

Inside of the power piston chamber are located a flyweight to be moved by centrifugal force and a servo valve to be axially moved by the flyweight. The servo valve is fitted on the outer peripheral surface of the power piston. The engine oil, supplied from an oil pan to the drive shaft, is conducted from a mount bolt into a power piston chamber through a power piston and a servo valve and conversely is returned from the power piston chamber to the oil pan through the passage on the outer peripheral surface of the mount bolt depending upon the action of the servo valve.

16 Claims, 12 Drawing Sheets

FIG_1
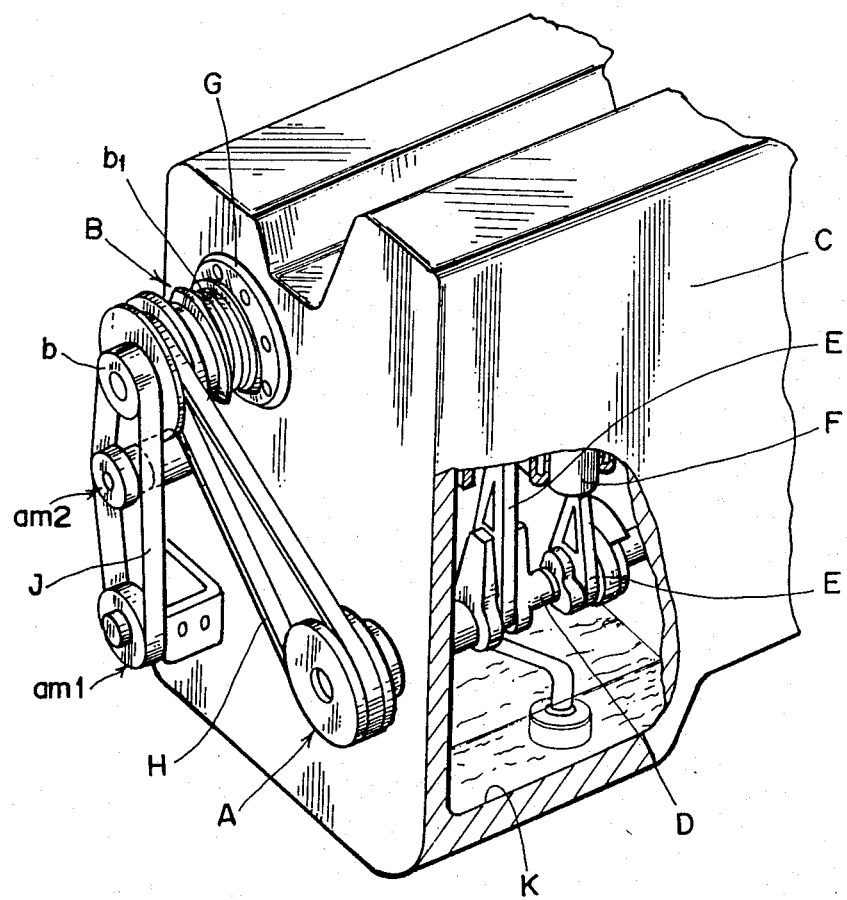

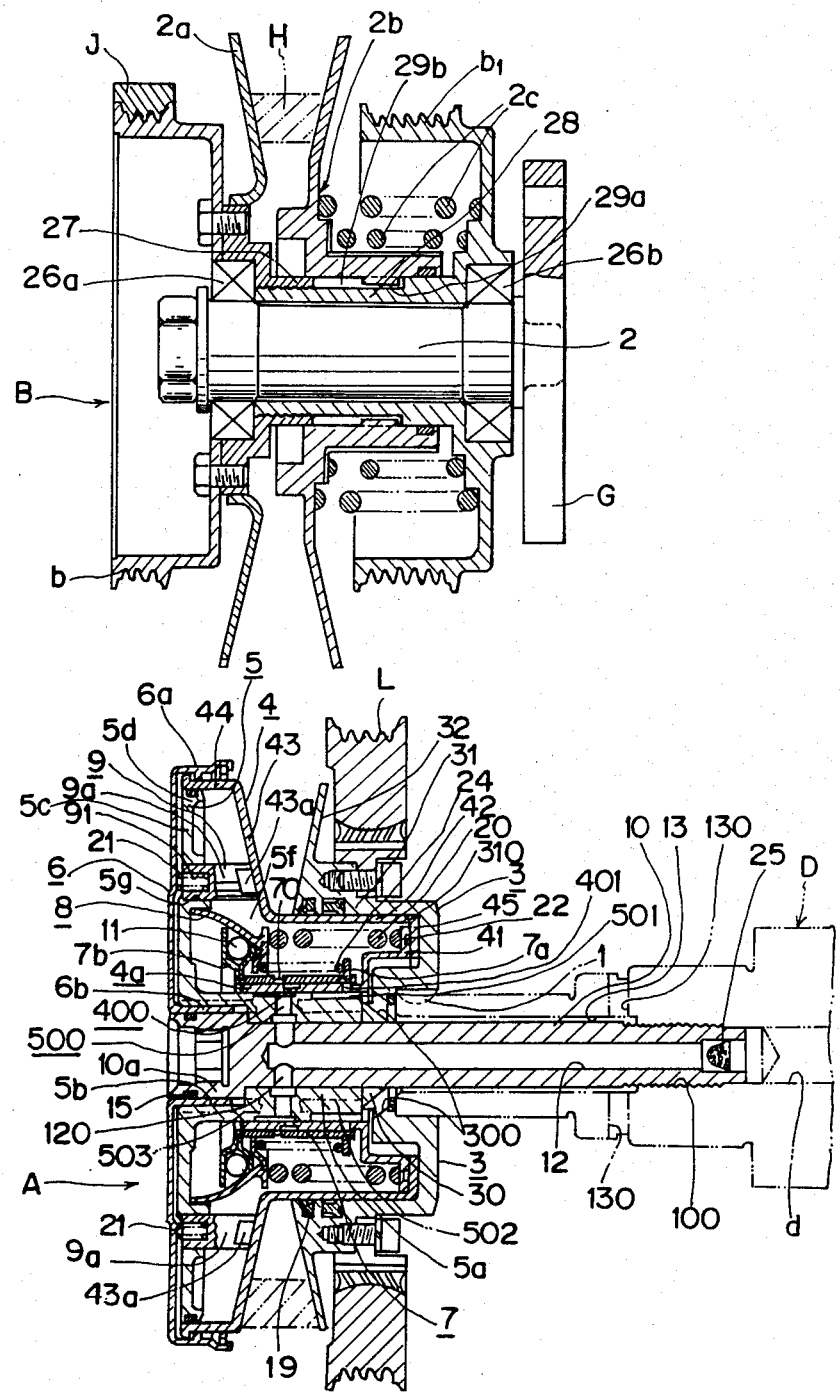

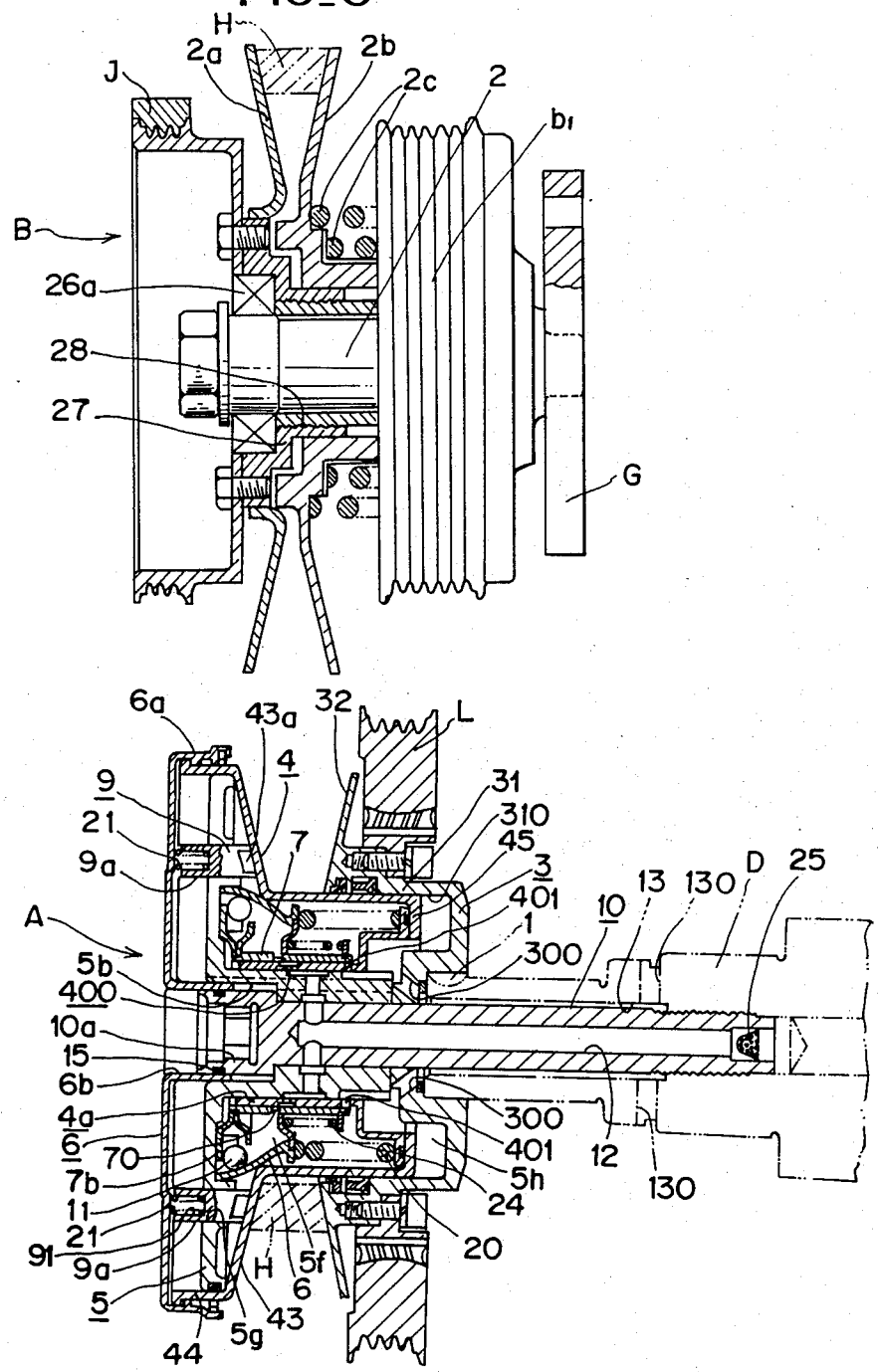
FIG_3

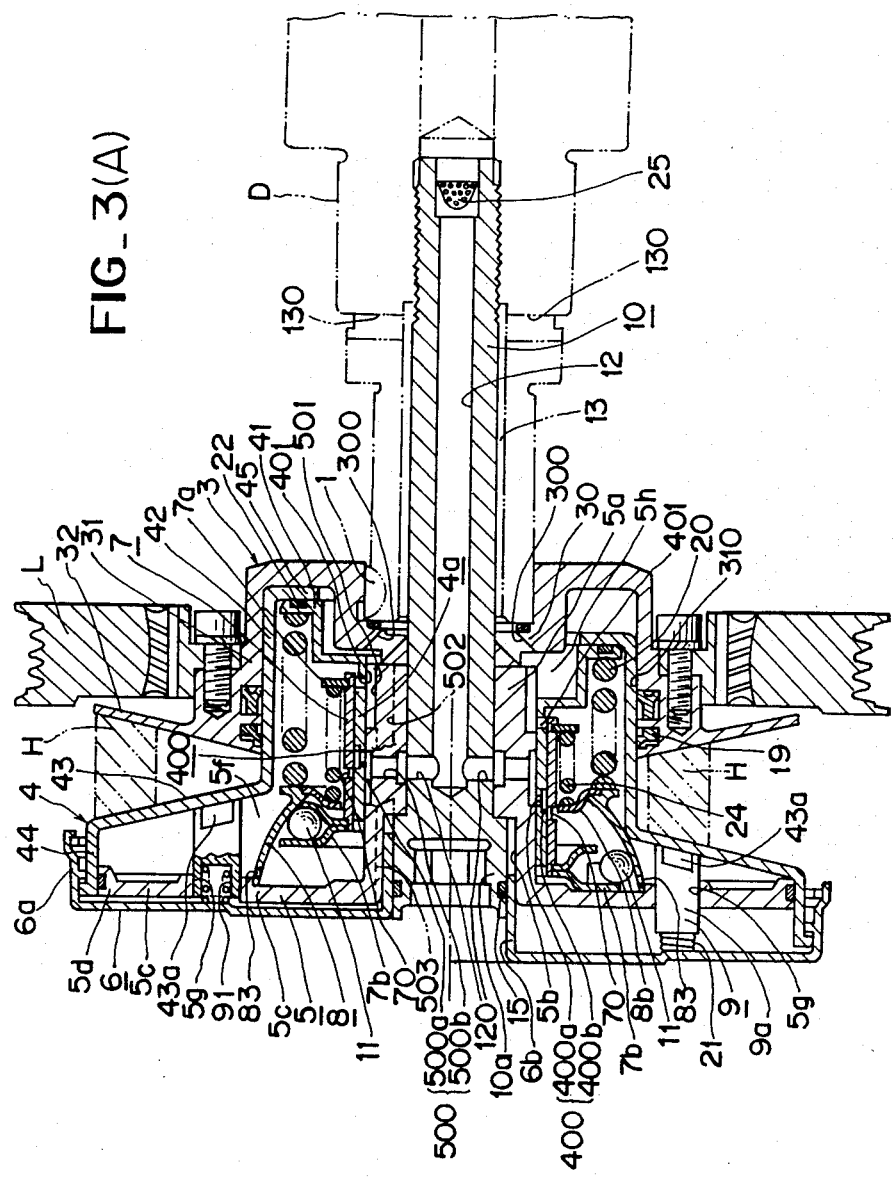
FIG_3(A)

FIG_4
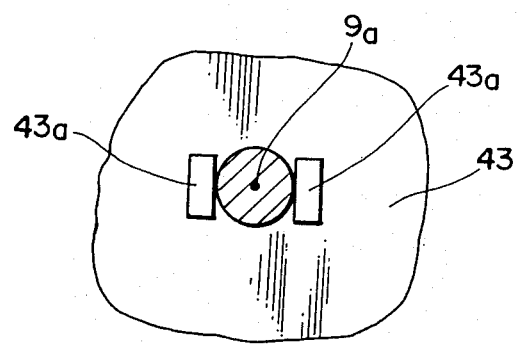
FIG_5
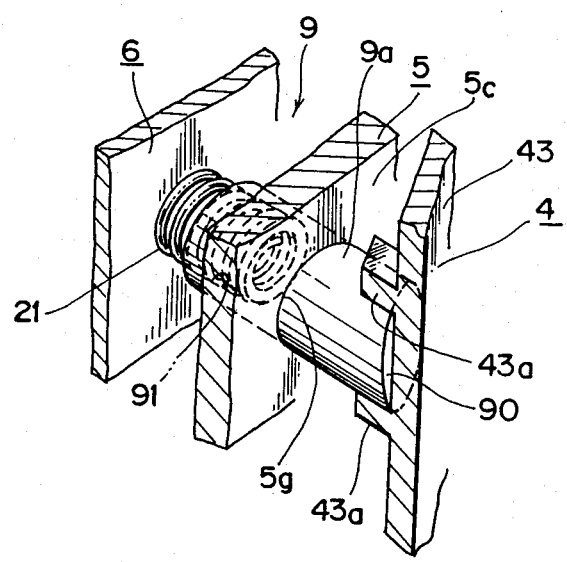

FIG_6
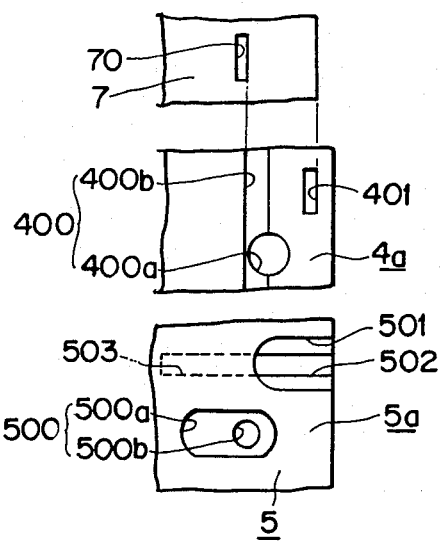
FIG_7
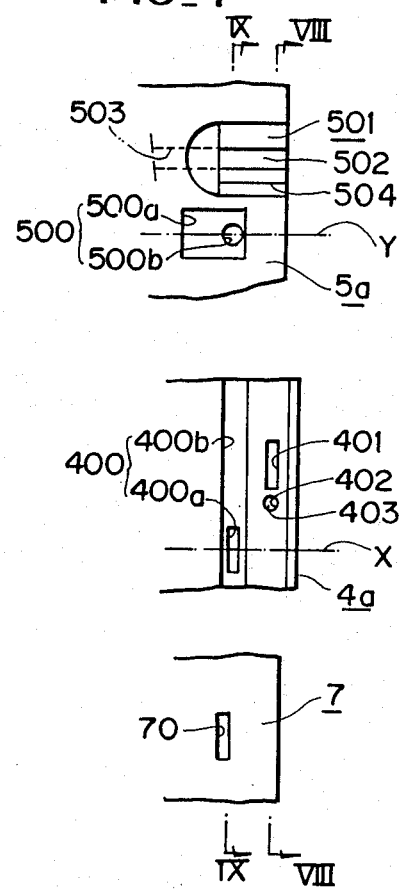
FIG_8
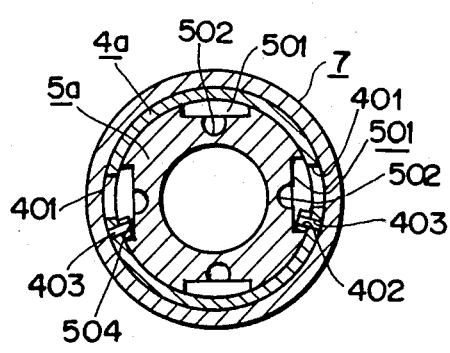
FIG_9
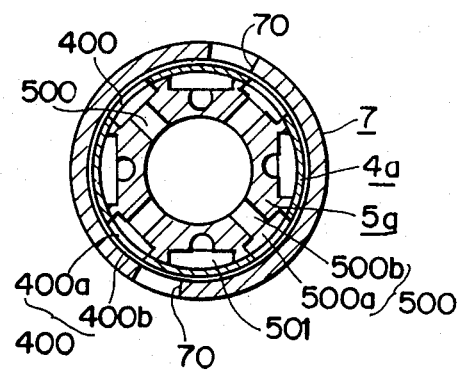

FIG_10
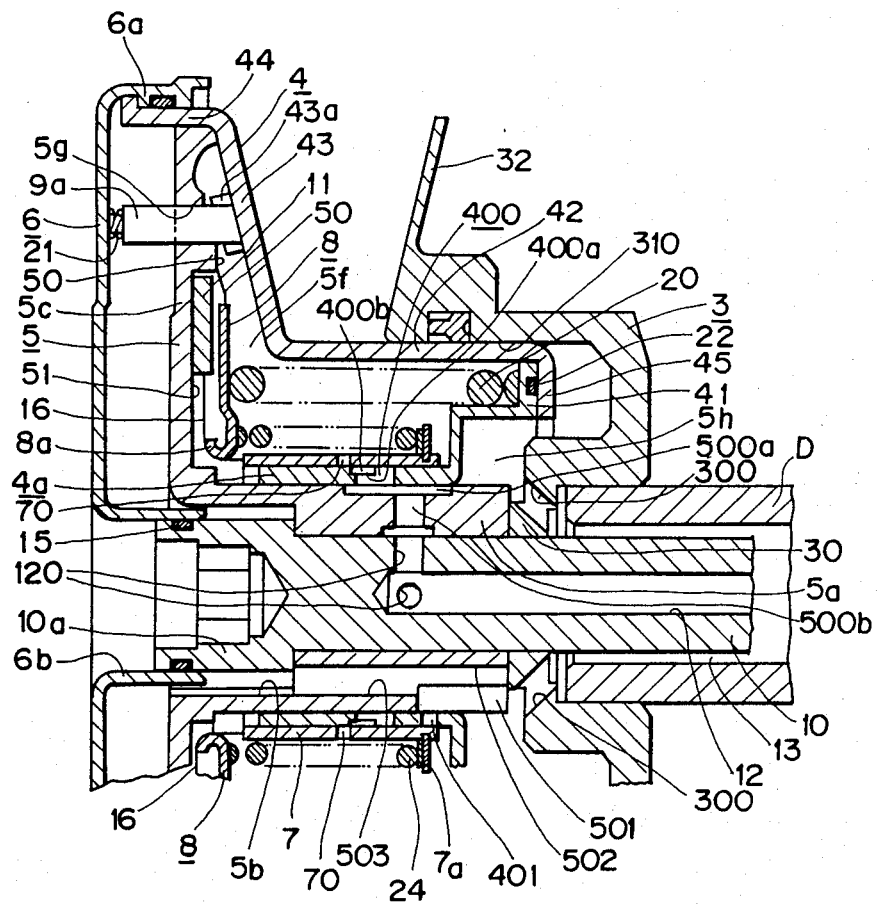

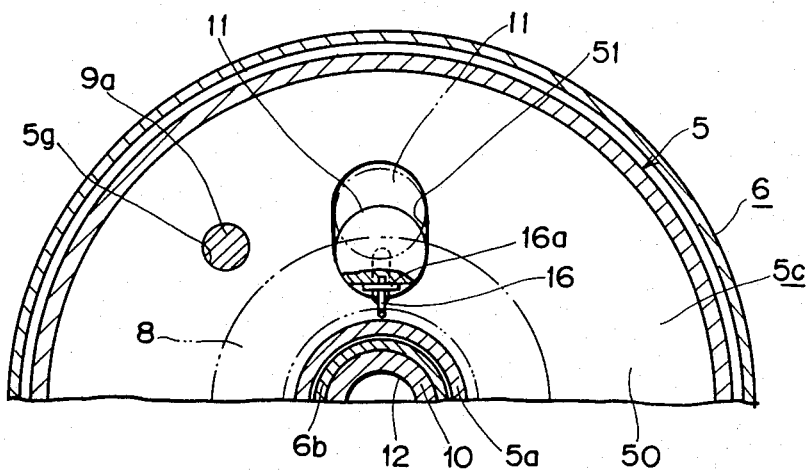
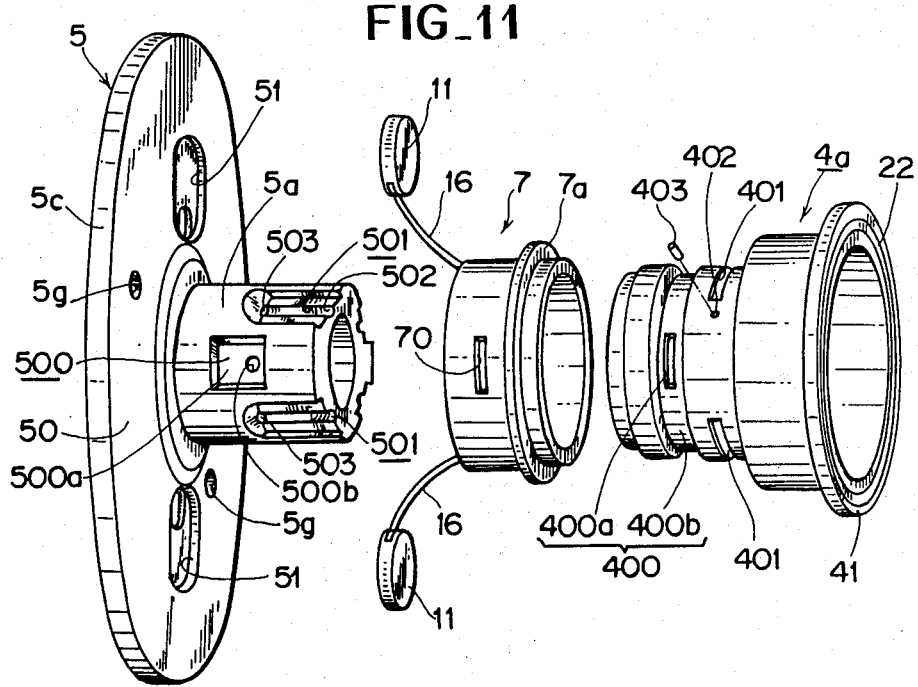

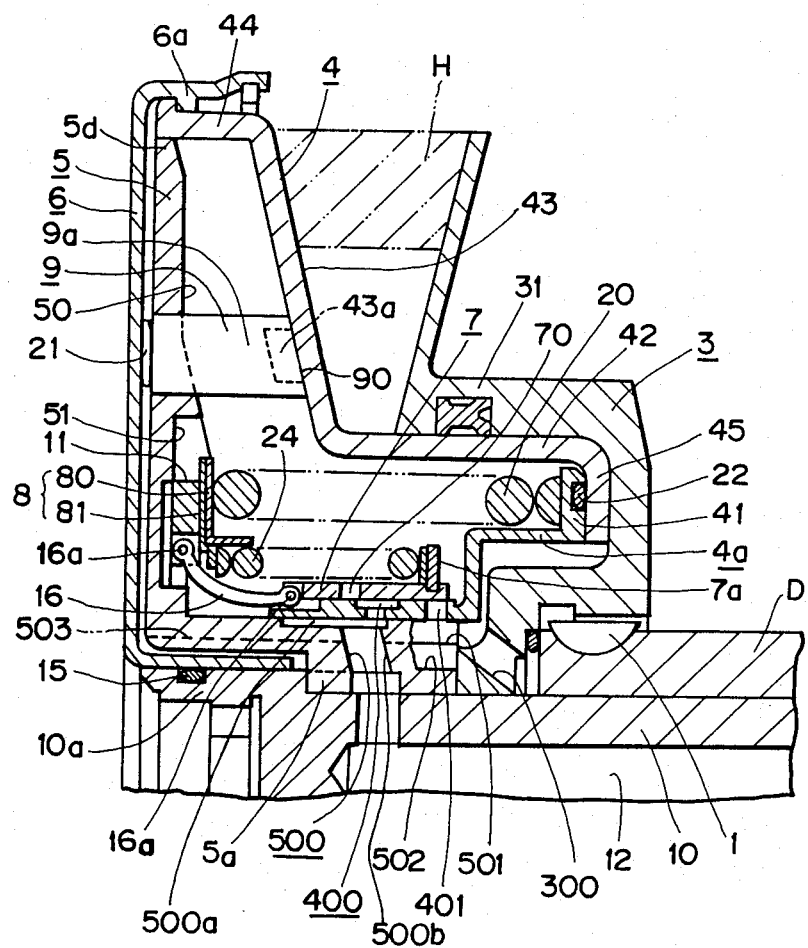
FIG_12

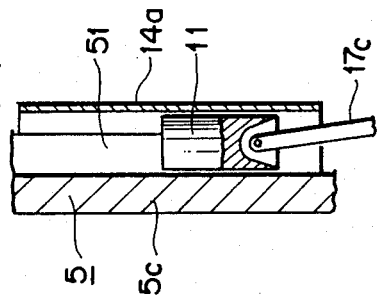
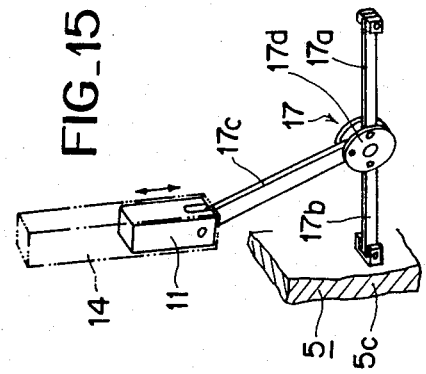
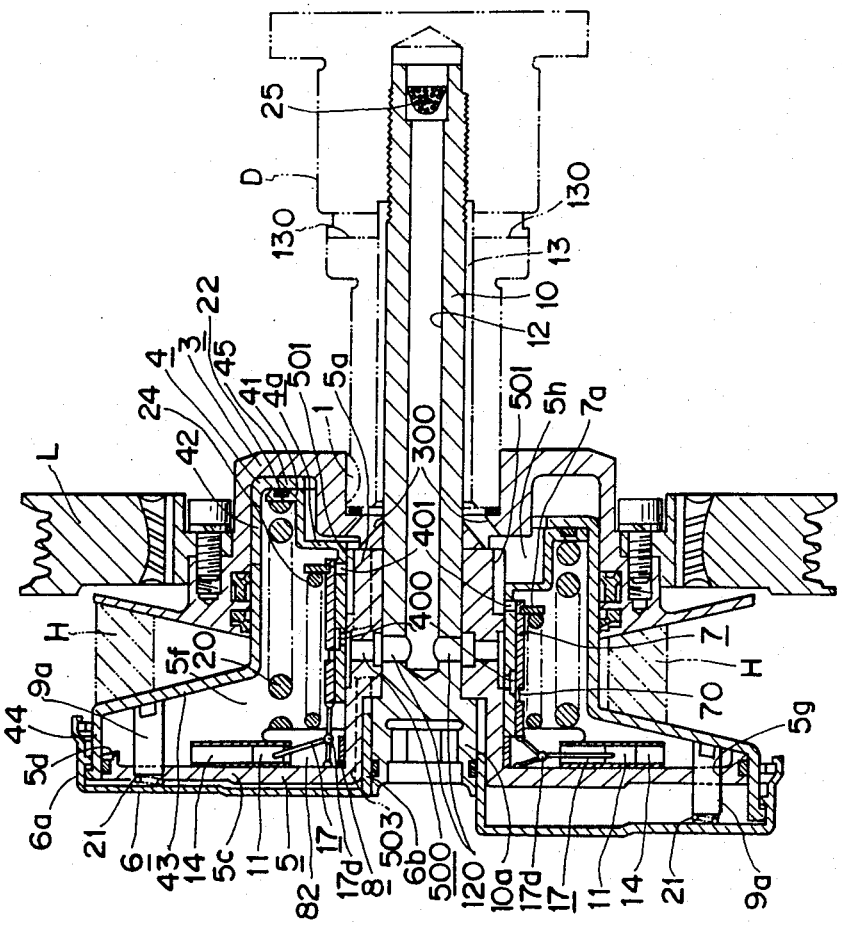

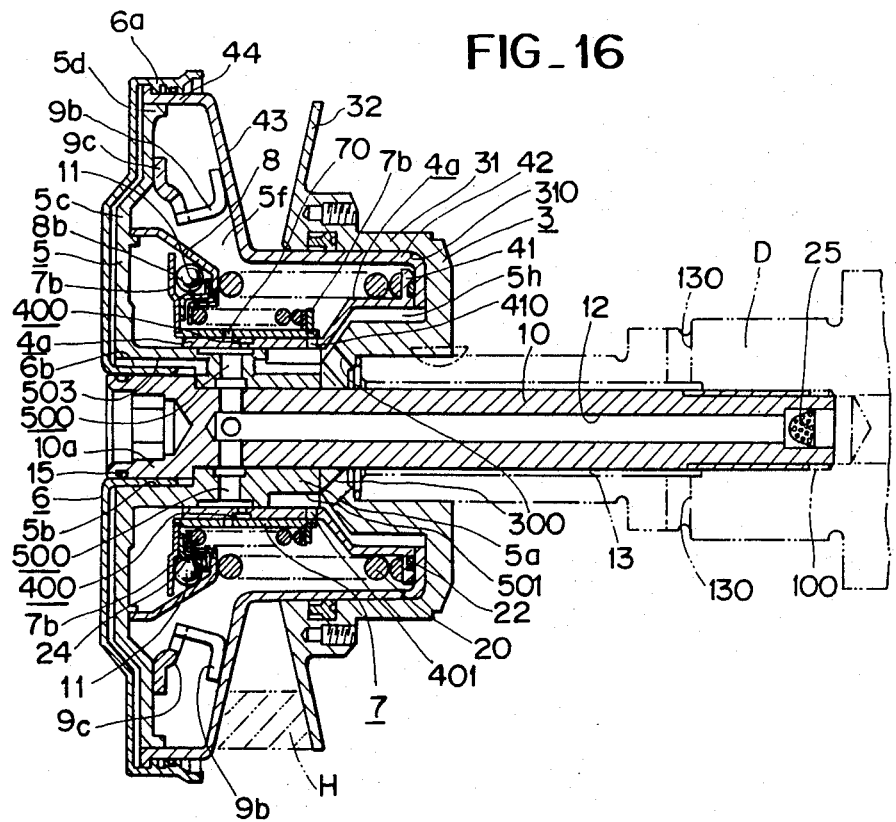
FIG_16
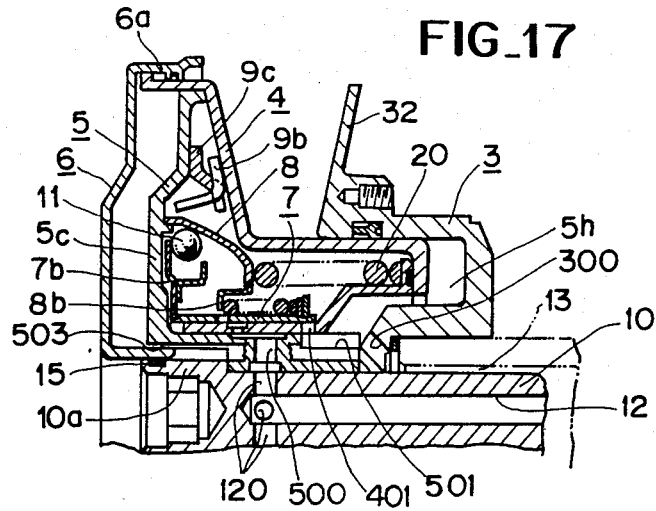
FIG_17

FIG_18
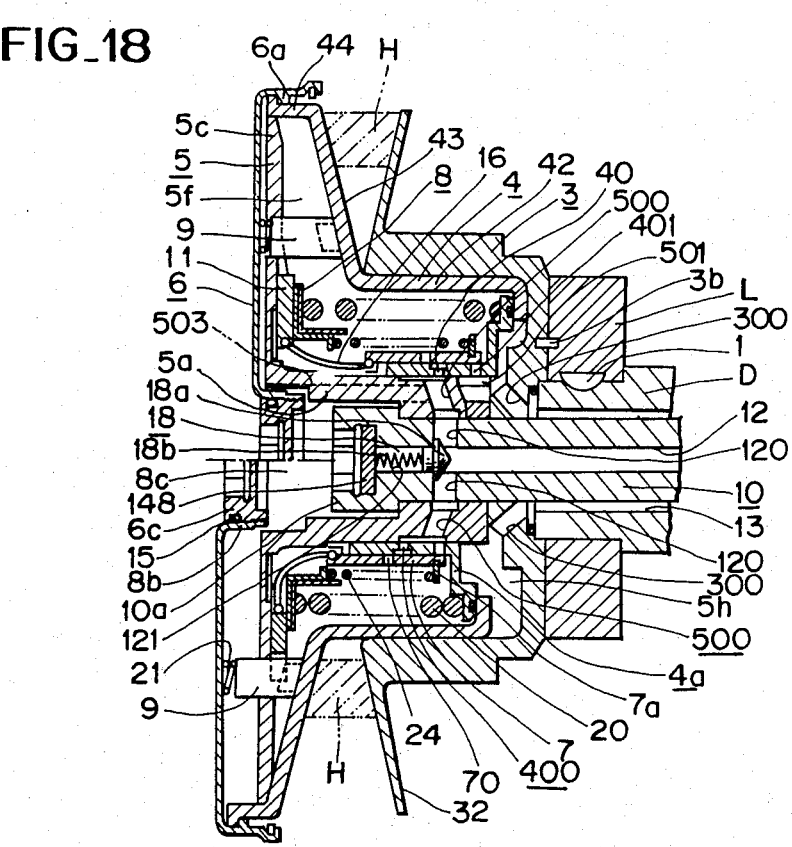
FIG_18(A)
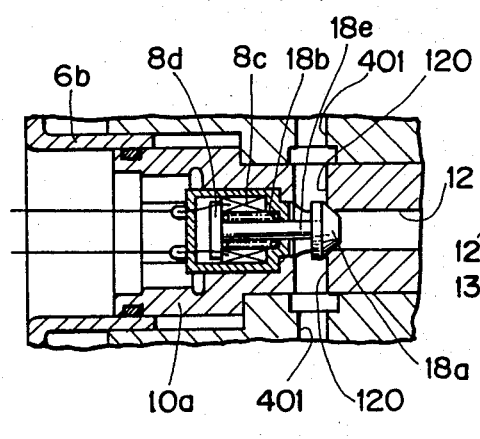
FIG_18(B)
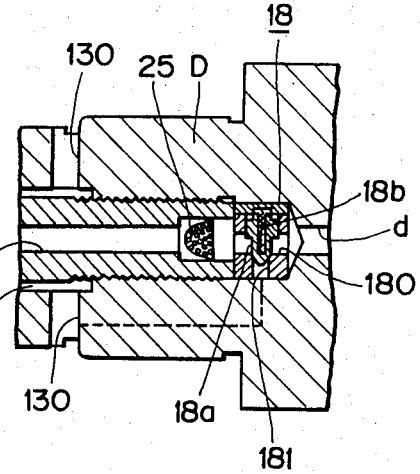

STEPLESS SPEED VARIATOR OF A BELT TYPE

FIELD OF THE INVENTION

The present invention relates to a stepless speed variator of a belt type, and more particularly to a V belt winding drive stepless speed variator including a built-in oil pressure servo mechanism.

BACKGROUND OF THE INVENTION

In automobiles, the rotation of an engine is a source of driving force for various auxiliary machines such as a supercharger, an air compressor used for an air-conditioner or a power steering pump. Conventionally, a means for transmitting the rotation torque of an engine to the auxiliary machines has been only a combination of fixed pulleys provided on a crank shaft and the input shaft of an auxiliary machine and a V-belt between both fixed pulleys. This means produces no change of a diameter of a pitch circle formed between both pulleys. As an engine speed increases, that of the auxiliary machine also increases in proportion. For example, though the auxiliary machine requires just 2000 to 3000 r.p.m., the machine has been rotated more than required. It has resulted in bringing about the problems of heating and in addition large drive loss of the engine.

To cope with these problems, it is favorable to set the number of revolutions of the auxiliary machine to be high when the engine rotates at low speed in order to suppress increasing of the number of revolutions of the auxiliary machine though the number of revolutions of the engine increases. This method enables the engine to rotate at high speed as well as to make the engine smaller since the driving force is saved with the number of revolutions.

In the prior art, a mechanical stepless speed variator employing the V belt has been used for various industrial fields. The construction is that a drive shaft and a driven shaft are provided with fixed conical sieves respectively and the driven shaft is provided with a sliding sieve accessible with respect to the fixed sieve. The sliding sieve is designed to be pushed in the thrust direction by a coil spring. The fixed sieve has a feed screw and the sliding sieve has a female screw, and during rotation of the pulley, a handle connected to the feed screw is rotated to push the sliding sieve in the thrust direction so as to adjust the interval between both sieves for changing the speed. This construction needs external operations and therefore cannot be used for the auxiliary machine driving system in automobiles.

Furthermore, the Japanese Patent Laid-open No. 26845/1985 discloses the system for controlling the position of a movable cone sieve composing one side of a pulley by using an oil pressure servo mechanism.

This antecedent has the following construction; a movable cone pulley has a fixed cylinder in the axis, the piston rod of the fixed cylinder is pressed to the end of the movable cone pulley, the piston rod includes a duct formed thereon, the rear end of which passes through a cylinder chamber and the front end of which opens toward the end of the piston rod, and the duct is opened or shut by a sleeve through a flyweight of a drive shaft, a spring, an arm or a rod.

This construction has the shaft of the movable cone pulley located in series with the external piston rod so that the force of changing a pulley ratio by the change of driven side load is opposed to the oil pressure immediately applied to the piston rod. With the change of the driven side load, therefore, the pulley ratio is changed to make the drive side load constant (the pulley ratio is changed as the driven side load changes). It results in bringing about the problem that this prior art cannot be applied to drive control for an auxiliary machine of an automobile which needs a constant pulley ratio even in case of load change though it can be applied to the speed variator of a bicycle provided with a prime mover.

Moreover, this speed variator has the flyweight located at the rear of the fixed pulley and the piston located at the rear of the movable pulley, connects the slider for controlling ejection of oil from the duct formed on the piston to the arm connecting both pulleys, and employs an external large exclusive fixed cylinder and pump. Hence, this prior art is made bulky in the axial dimensions and unfeasible to be installed into an automobile.

SUMMARY OF THE INVENTION

It is an object of this invention to provide a compact V belt drive stepless speed variator of an oil pressure servo type which offers the characteristics of being able to continuously change a pulley ratio depending upon the number of revolutions of the drive shaft without any external operation and making the number of revolutions of the auxiliary machine essentially constant even in case of increasing the number of revolutions of a engine by setting that of the auxiliary machine, that is, the driven side to be high when the engine rotates at low speed, and which is fitted for the small space of an engine room because of short axial dimensions.

It is another object of this invention to provide a V belt drive stepless speed variator of an oil pressure servo type which has a capability of smoothly moving a slide pulley on the drive side, producing stable and large speed-controlling force and thus obtains a wider setting range of speed changing characteristics.

In order to achieve these objects, the present invention is characterized by offering a power piston chamber inside of a rigid pulley and a slide pulley attached on a drive shaft and incorporating inside of the power piston chamber a flyweight to be moved by centrifugal force and a servo valve to be axially moved by the flyweight so as to conduct the engine oil, supplied from an engine oil pan to the drive shaft, in or out of the power piston chamber through a servo valve.

To represent this invention more visibly, the stepless speed variator of a belt type including a drive pulley mounted on an engine drive shaft and a driven pulley for the auxiliary machine communicating with the drive pulley through the V belt and for continuously changing diameters of pitch circles of both pulleys depending upon the number of revolutions of the engine, comprising;

the driven pulley providing a fixed pulley provided with a pulley for the auxiliary machine and a moving pulley to be moved to the fixed pulley by a spring, the drive pulley providing;
I. a rigid pulley fixed on the drive shaft,
II. a mount bolt coaxially connected to the drive shaft,
III. a guide holder fitted in the mount bolt and including a cylindrical shaft to be rotated together with the mount bolt and a flange formed on the end of the cylindrical shaft, IV. a slide pulley to be axially moved by the flange guiding the outer peripheral side thereof and the rigid pulley guiding the inner peripheral side thereof and to be rotated together with the rigid pulley by a motion transmission means,
V. a centrifugal force offsetting cover located at the back of the guide holder flange and to be moved together with the slide pulley,
VI. the slide pulley being combined with a tubelike power piston to be moved along the guide holder shaft, the power piston and the slide pulley being constantly pulled toward the rigid pulley by a power spring, thereby forming variable power piston chamber defined by the power piston, the slide pulley, and the guide holder flange,
VII. a supply passage within the mount bolt for engine oil supplied through the drive shaft and an ejection passage provided on the outer periphery of the mount bolt for returning the engine oil from the power piston chamber to the drive shaft,
VIII. the power piston providing a cylindrical servo valve for controlling conducting the engine oil in or out of the power piston chamber, the servo valve being fitted to the outer periphery of the power piston in such a manner as relatively moving in the axial direction and being constantly pulled toward the rigid pulley by a governor spring, while the servo valve being moved as opposed to the governor spring depending on the displacement of the flyweight located in the power piston chamber with the rotation of the drive shaft,
IX. the centrifugal force offset cover communicating with the engine oil ejection passage in the interior thereof in such a manner as, when the slide pulley is moved, conducting the engine oil through the engine oil ejection passage and preventing the slide pulley from being shut by the rotation oil pressure.

The above-described construction allows, when the engine is stopped, the engine oil in the oil pan to be supplied from the supply passage of the mount bolt to the power piston chamber through the servo valve and thus the slide pulley to be retained on the shutting side by the spring.

When the engine is driven, the rigid pulley is caused to rotate and the rotation torque of the drive shaft is transmitted to the slide pulley through the mount bolt, the guide holder, and the motion transmission means, so that the slide pulley is rotated. At a time, the flyweight starts to be moved by the centrifugal force, and when the centrifugal force overcomes the force of the spring, the servo valve is caused to move in the axial direction. It results in stopping the supply of the engine oil to the power piston chamber, ejecting the oil from the chamber to the passage provided on the outer periphery of the mount bolt, and making it flow through the centrifugal force offset cover.

As a result, the pressure acting on the slide pulley is made lower. The slide pulley and the power piston follow the servo valve in the axial direction, that is, externally by the tension of a gear belt.

With the increase of the number of revolutions of the engine, therefore, the pitch circle diameter of the speed variator belt located on the drive pulley is made smaller, while the pitch circle diameter located on the driven pulley is made larger by the force of the spring. The auxiliary machine is driven at the lower number of revolutions than the increased number of revolutions of the engine since it is driven by the driven pulley.

If a number of steel balls are located within the slide pulley as a flyweight, the abrasion is produced among the steel balls, which gives an obstacle to the smooth speed changing operation. However, since the slide pulley is moved by conducting the engine oil supplied by the oil pump in or out of the power piston chamber with the servo valve, the slide pulley can be moved very smoothly for the benefit of the combination of conducting and lubricating effects. In addition, since the power piston chamber for applying the spring force and the oil pressure is formed within the overall inside of the slide pulley, the control force for the slide pulley is strong and stable.

Furthermore, the present invention can achieve short dimensional and very compact construction on the ground that the power piston chamber offering the power piston, the servo valve and the flyweight is located inside of the slide pulley and the axial supply and ejection of the engine oil is done in the core and on the periphery of the mount bolt. It can be thus accommodated in the limited space located to the forward of the engine block.

The other constructions and their relevant effects according to this invention will become apparent from the following description of an embodiment.

BRIEF DESCRIPTION OF THE DRAWINGS

FIG. 1 is a perspective view showing a state embodying a stepless speed variator of a belt type according to this invention;

FIG. 2 is a cross sectional view showing one embodiment balanced at low speed;

FIG. 3 is a cross sectional view showing the balanced state of the embodiment at high speed;

FIG. 3-A is an enlarged view of a pulley of a drive side of FIG. 3;

FIG. 4 is a partial front view of a slide pulley in the embodiment shown in FIGS. 2 and 3;

FIG. 5 is a perspective view showing a relation between a motion transmission mechanism, a slide pulley, and a guide holder;

FIG. 6 is a developed view showing one embodiment of a passage construction for a guide holder, a power piston, and a servo according to this invention;

FIG. 7 is a developed view showing the other embodiment of the passage construction;

FIG. 8 is a cross sectional view along VIII—VIII line of FIG. 7;

FIG. 9 is a cross sectional view along IX—IX line of FIG. 7;

FIG. 10 is a cross sectional view showing the drive pulley balanced at high speed when a tabular member is employed as a flyweight;

FIG. 11 is a perspective view showing a disassembled state of the above;

FIG. 12 is a cross sectional view showing an embodiment of the other drive pulley when a tabular member is employed as a flyweight;

FIG. 13 is a half cross sectional view of the embodiment shown in FIG. 12;

FIG. 14 is a cross sectional view of a drive pulley showing an embodiment employing a column body as a flyweight the upper half of which view shows the balanced state at low speed and the lower half of which shows the balanced state at high speed;

FIG. 14-A is a partially enlarged view showing a different flyweight guide from that shown in FIG. 14;

FIG. 15 is a perspective view showing the detail of a link mechanism shown in FIG. 14;

FIG. 16 is a cross sectional view of a drive pulley, showing other embodiment of the motion transmission mechanism;

FIG. 17 is a partially cross sectional view showing the balance of the drive pulley at high speed;

FIG. 18 is a cross sectional view showing the other embodiment of this invention; and FIGS. 18-A and 18-B are partially cross sectional views showing the other embodiment of an oil supply control valve shown in FIG. 18.

DETAILED DESCRIPTION

Hereinafter, the embodiments of this invention will be described with reference to the appended drawings.

FIG. 1 shows a stepless speed variator according to this invention, mounted to an engine, where C denotes an engine block, D denotes a drive shaft (crank shaft) mounting a con'rod E through which a piston F is reciprocated.

A denotes a drive pulley provided on the drive shaft located outside of the engine block. B denotes a driven pulley located by an attaching plate G at a dislocated position from the drive pulley A. A speed variator belt H is bridged between the drive pulley A and the driven pulley B.

am1 and am2 denote auxiliary machines mounted to the engine block C or thereabout, for example, am1 is an air compressor and am2 is a power steering pump. These auxiliary machines am1 and am2 have pulleys which are rotated by a belt J bridged between the pulley of the auxiliary machine am1 and a pulley b of the auxiliary machine provided on the driven pulley B.

FIGS. 2, 3, and 3-A show the embodiment of the drive pulley A and the driven pulley B in detail.

In the driven pulley B, a bolt 2 served as a driven shaft is located in parallel to the drive shaft D of the drive pulley A and is secured on a mount plate G by an inverse screw. A fixed pulley 2a is rotatably supported by the bolt 2 through a bearing 26a. The cylindrical portion 27 of the fixed pulley 2a is screwed with a cylindrical spring receptor 28. A movable pulley 2b is fitted on the outer peripheral surfaces of the cylindrical spring receptor 28 and the cylindrical portion 27. The pulley 2b provides a spline 29a inside thereof, which is engaged with a spline 29b of the cylindrical spring receptor 28 for transmitting the rotation torque. Between the movable pulley 2b and the cylindrical spring receptor 28 is laid a driven spring 2c, which serves to push the movable pulley 2b toward the fixed pulley. This embodiment provides a drive pulley b₁ on the cylindrical spring receptor 28.

Next, the drive pulley A provides a hollow rigid pulley 3 fitted to the tip of the drive shaft D and secured by a key 1 and a slide pulley 4 operated in combination with the rigid pulley 3. The speed variator belt H is suspended at a given tension between the pulley 3 and the driven pulley 2a and between the pulley 4 and the driven pulley 2b.

5 denotes a guide holder. It includes a hollow shaft 5a, the tip (right end) of which is pressed and positioned on the boss 30 of the rigid pulley 3. The shaft 5a is formed with an enlarged hole 5b over a given distance from a rear end (left end). The shaft 5a is mounted with a belt 10 having a head 10a with an outer diameter enough to define a determined ring gap between an enlarged hole 5b and the shaft 5a. The mount bolt 10 is screwed into a screw hole 100 formed in the drive shaft D in a manner to allow a drive torque to be acted in the screwing direction, thereby fastening the guide holder 5. The guide holder 5, therefore, can receive the rotation torque of the drive shaft D.

The rear end (left end) of the shaft 5a provides a flange 5c integrally formed thereon, which projects in the radial direction. The flange 5c is connected with the slide pulley 4 through the motion transmission means 9, which will be described later. The flange portion is located between the motion transmission means 9 and the shaft 5a, and secures a spring receiving member 8. The outer periphery of the flange 5c serves as an axial slide guide 5d.

The slide pulley 4 is equipped with a power piston 4a to be moved therewith. Although the power piston 4a may be formed integrally with the slide pulley 4, in this embodiment, for facilitating work or assembly, the power piston 4a is made independently of the slide pulley 4 and is fitted slidably to the shaft 5a of the guide holder 5. The rear end (right end) of the power piston 4a is bent in the radial direction, and the bent portion extends to form a cylinder enlarged in an axial direction, the end of which provides an end wall 41 radially projected.

The slide pulley 4 provides an inner cylinder portion 42 being in contact with the inner wall 310 of the cylinder 31 of the rigid pulley 3 through an oil seal 19, an inclined portion 43 comprising a V-shaped groove with the inclined portion 32 of the rigid pulley 3, and an outer cylinder portion 44 being circumscribed with the slide guide 5d of the guide holder 5. The end of the inner cylinder portion 42 contains a stop wall 45 being bent toward the axis of rotation, which wall 45 is in contact with the end wall 41 via an O ring 22.

In the above-described construction, a power piston chamber 5f is defined with a variable capacity by the power piston 4a, the end wall 41, the inner cylinder portion 42, the inclined portion 43, the outer cylinder portion 44, and the flange 5c of the guide holder 5. Between the end wall 41 and the spring-receiving member 8 is bridged a power spring 20, which serves to connect the power piston 4a with the slide pulley 4, and push them toward the rigid pulley direction.

6 denotes a centrifugal force offsetting cover located at the back of the flange 5c of the guide holder 5. The centrifugal force offsetting cover 6 has a cross sectional shape analogous to that of the flange 5c of the guide holder 5, and an outer peripheral surface thereof is linked to the outer cylinder portion 44 of the slide pulley 4. This linking may depend on a screw fitting means. In this embodiment, the outer peripheral surface provides a cap portion 6a formed thereon, which is engaged with a pawl projected on the outer cylinder portion 44 of the slide pulley 4 for carrying out integral rotations and translations together with the slide pulley 4.

The inner peripheral side of the centrifugal force offsetting cover 6 has a bent boss 6b, the tip of which is directed to the rigid pulley. The boss 6b is slidably fitted into the gap between the head 10a of the mount bolt 10 and the expanded hole 5b. The head 10a has a seal ring 15 coming into contact with the inner peripheral surface of the boss.

7 denotes a cylindrical servo valve slidably fitted around the power piston 4a, and the servo valve 7 is normally biased to the right hand, that is, toward the rigid pulley 3 by a governor spring 24 bridged between the spring-receiving member 8 and the stopper ring 7a fixed nearby the rigid pulley 3.

Herein, a reference will be directed to the motion transmission means 9. It employs a plurality of pins 9a in the embodiment shown in FIGS. 2 and 3. The details are shown in FIGS. 4 and 5. The pin 9a has a slope surface 90 at the tip, which corresponds to the gradient of the inclined portion 43 of the slide pulley 4, and a hole 91 of a given depth at the rear end.

In order to receive the torque transmitted through the motion transmission means 9, the inclined portion 43 of the slide pulley 4 provides at least two projections 43a in the peripheral direction to which the tip of the pin 9a is fitted. The guide holder flange 5c is formed with a hole 5g which is coaxial with centers of projections 43a, 43a. The pin 9a passes axially through the hole 5g in sliding contact.

In addition, it is preferable that a spring 21 is inserted into the hole 91 of the pin 9a, which spring 21 serves to push the tip slope 90 of the pin 9a against the inclined portion 43 in that the rear end of the spring is supported by the inner surface of the centrifugal force offset cover 6.

Assuming that the motion transmission means 9 is composed of the pin 9a only, and comes into contact with the inclined portion 43 through the through hole 5g of the guide holder 5, the oil pressure of the power piston chamber 5f causes the tip of the pin to rise from the inner surface of the pulley and then to rotate itself. The slope surface 90, therefore, slips with respect to the inclined portion 43 and is often placed at the improper position. However, since the spring 21 serves to pull the pin 9a at its rear end, the slope surface 90 at the tip of the pin is constantly pushed against the inclined portion 43. Thus, the self-rotation of the pin 9a as said is not caused and the slide pulley may be moved together with smooth torque transmission. Alternately, when the pin 9a passes through the hole 5g of the guide holder 5 so as to contact the inclined portion 43, it is difficult and troublesome to fit the pin 9a between the projections 43a and 43a in assembling the device. On the other hand, by inserting the spring 21 in the hole 91, the pin 9a can be easily fitted between the projections 43a and 43a by virtue of the spring 21, thereby facilitating the assembly.

11 denotes a flyweight which serves to apply thrust to the servo valve 7 in response to the rotation of the drive shaft 1 and to move it against the spring force of the governor spring 24 in the axial direction (the reverse direction to the rigid pulley). In this embodiment, the flyweight 11 is composed of a plurality of (e.g., 6) hard balls (e.g., steel or ceramic ball) and is retained by a forked retainer 7b provided integrally with the other end of the servo valve 7 in a manner to move in the axial direction. The retainer 7b has a left end formed to receive the trust applied by the flyweight 11. And, this embodiment has a cup-like spring-receiving member 8, the inner surface of which forms a track for guiding the flyweight 11. It is preferable to allow the base end of the spring-receiving member 8 to communicate with the power piston chamber 5f through a passage hole 83. This is to prevent the track from disposition of the dirt mingled in the engine oil.

As well known, in automobile engines, an oil pan K is provided on the bottom of the engine block C for lubricating and cooling down the rotating or sliding part of an engine. The rotation of the drive shaft D serves to suck the engine oil stored in the oil pan K and supply to each of parts of the engine through the holes formed in the drive shaft D and other tubes. This invention is designed to conduct the engine oil in or out of the power piston chamber 5f using this mechanism.

As will be understood from FIG. 3-A, a supply passage 12 is formed from the tip (right end) of the bolt 10 toward the axial direction. This supply passage 12 communicates with the oil passage d of the drive shaft D through a filter 25. This construction is more beneficial than the prior art construction of conducting the engine oil from the rear end of the bolt 10, that is, a belt side, because the latter needs the other pipe arrangement and substantially enlarges the axial dimensions of the device.

On the other hand, a tubular ejection passage 13 is formed between the outer peripheral surface of the mount bolt 10 and the inner diameter of the drive shaft D. This ejection passage 13 has a rear end (left end) leading to the boss 30 of the rigid pulley 3 and constantly communicates with the drain chamber 5h located outside of the power piston chamber through a plurality of slope holes 300 formed in the boss 30. The tip (right end) of the ejection passage 13 communicates with the space above the oil pan through radial holes 130 extending to the outer peripheral surface of the drive shaft D.

The supply passage 12 extends to the position immediately before the head 10a, preferably, the area corresponding to the middle of the power piston chamber 5f, where formed are a plurality of radial distributing holes 120 extending to the outer peripheral surface of the bolt 10.

The distributing holes 120 are designed to communicate with the power piston chamber 5f through a given passage formed in the guide holder shaft 5a, the power piston 4a, and the servo valve 7 surrounding the mount bolt 10. The slope holes 300 are also designed to communicate with the drain chamber 5h through these members.

FIGS. 3-A and 6 show one embodiment of the passage formation. The power piston 4a provides a supply hole 400 at the longitudinal middle position and a plurality of drain holes 401 communicating with the drain chamber 5h at the position biased to the tip (right end).

As will be understood from FIGS. 3-A and 6, the engine oil supply hole 400 is composed of cylindrical high pressure holes 400a (plural) and one shallow ring groove 400b, the portion of which communicates with the high pressure holes 400a. These high pressure holes 400a respectively communicate with the distributing holes 120 of the mount bolt 10 through a supply port 500.

As shown in FIGS. 3-A and 6, the supply port 500 comprises axially-extending and shallow grooves 500a (plural) formed in the outer peripheral surface of the guide holder shaft 5a and holes 500b extending below from the bottoms of the grooves 500a. These grooves 500a enable the distributing holes 120 to communicate with the high pressure holes 400a wherever the power piston 4a may be located.

The servo valve 7 includes at least one control hole 70 penetrating in thickness, which is a longitudinal hole in the peripheral direction as shown in FIG. 6. In the balanced state as shown in FIGS. 2 and 3, the servo valve 70 is positioned in a manner to stop the communication between the supply hole 400 of the power piston 4a and the control hole 70 as well as to allow the cylindrical wall on the servo valve end to stop the communication between the drain hole 401 and the power piston chamber 5f.

Next, the ejection passage will be described. The drain hole 401 of the power piston 4a is formed as a longitudinal hole as shown in FIG. 6, and communicates with the drain chamber 5f through an ejection port 501 formed in the guide holder shaft 5a as shown in FIG. 3-A and a plurality of holes 300 penetrating the boss of the rigid pulley 3. The ejection port 501 is, as shown in FIG. 6, formed as a cutout groove leading to the end of the guide holder shaft, and a plurality of the ejection ports 501 are disposed at the portions dislocated from the supply port 500 in the peripheral direction.

The ejection port 501 is formed with a deeper groove 502 in the bottom, which groove, served as a communicating hole 503, extends into the centrifugal force offset cover 6 in the axial direction of the guide holder shaft 5a.

FIGS. 7 to 9 and 11 show the other embodiment of the supply and discharge passage mechanism which is able to more properly conduct the engine oil in or eject it out of the power piston chamber 5f. In this embodiment, the supply hole 400 of the power piston 4a includes a ring groove 400b and a longitudinal hole 400a, served as a high pressure hole, penetrating from the bottom of the groove 400b through the cylinder wall. A positioning pin hole 402 is formed near the drain hole 401.

On the other hand, to allow the distributing hole 120 to communicate with the longitudinal hole 400a wherever the power piston 4a is located, the supply port 500 of the guide holder shaft 5a includes a long groove 500a having the same width as the longitudinal hole 400a, in the bottom of which a hole 500b is formed to penetrate through the thickness.

Furthermore, the ejection port 501 of the guide holder shaft 5a is formed as a cutout groove leading to the end of the guide holder shaft so as to constantly communicate with the drain hole 401 wherever the power piston 4a is located. For positioning these passage components, as shown in FIGS. 7 and 8, a pin guide groove 504 is formed in the axial direction, in which a pin 403 is inserted through the positioning pin hole 402. In this construction, the power piston 4a and the guide holder shaft 5a are set up such that the circumferential center axes X of the longitudinal hole 400a shown in FIG. 7 constantly corresponds to the center axes Y of the long groove 500a and the hole 500b.

FIGS. 10 to 15 show the embodiment wherein the flyweight is radially moved along the guide holder flange 5c. This embodiment makes the mass of the flyweight larger than that wherein balls are employed for the flyweight as shown in FIGS. 2 and 3. It can, therefore, reduce the number of flyweights and make the axial dimensions of the pulleys shorter than the system of guiding the balls along the ar track.

The system of guiding the balls along the ar track is designed to provide a spring-receiving portion at the tip side of the track member, that is, near the rigid pulley. The spring-receiving portion, therefore, restricts the height (axial length) of the governor spring 24 or the power spring 20. As a result, the freedom for determining the spring force is lacked. On the other hand, the system of moving the flyweight 11 along the inner wall of the guide holder enables the spring-receiving member 8 to be directly mounted to the guide holder flange 5c. It results in increasing the heights (axial length) of the governor spring 24 or the power spring 20 and broadening the setting range of speed changing characteristics.

FIGS. 10 to 13 show the embodiment wherein as the flyweight 11 is employed a member having a linear surface at the side of facing at least the guide holder flange 5c. It is preferable to employ as the member a tabular plate having a selective form such as circle, ellipse, rectangle or square. As shown representatively in FIG. 11, a plurality of flyweights are symmetric with respect to the shaft and are respectively connected to the servo valve 7 by a link member 16 to be moved in curve.

The guide holder flange 5c provides a guide groove 51 formed in the inner wall 50, which groove radially extends so as to permit movement of the flyweight 11. The guide groove contains the flyweight 11 mounted therein. To prevent the flyweight 11 from falling down, on the inner wall 50 of the guide holder flange 5c is secured a spring-receiving member 8 having a diameter long enough to cover half or more of the length of the guide groove 51. The securing may be any means such as vis fixing, press fit, or adhesion. Or, it is possible to provide a pawl on the outer peripheral surface of the spring-receiving member and then to fit it in the groove provided on the inner wall.

In the embodiment shown in FIGS. 10 and 11, the link member 16 may employ a flexible member such as a flexible wire, an oilproof synthetic fiber string, a strand, or a band. Further, as shown in FIG. 10, the spring-receiving member 8 is formed with a curvature guide 8a contact the link member 16 and guide it in curved condition.

In the embodiment shown in FIGS. 12 and 13, the link member 16 employs an inflexible link which does not have bendablity in itself, and is curved at desired curvature to allow to pass freely under the spring-receiving member 8, and the ends of the link member 16 are respectively connected to the flyweight 11 and the servo valve 7 by a coupling element 16a such as a pin. The link may be any one of a lever or a bar, or may be composed of a pair of right and left links such as a parallel link. In this embodiment, the spring seat 8 is composed of a part 80 for the power spring 20 and a part 81 for the governor spring 24, which are integrally overlapped with each other.

In addition, if required, a solid lubricant such as silicon is applied on the sliding section between the guide groove 51 and the flyweight 11.

FIGS. 14 and 15 show the embodiment wherein a column flyweight 11 is used. Herein, "column" refers to cylindrical, prismatic, or said each form including a hollow portion. The flyweight 11 is slidably inserted in a cylindrical guide 14 secured on the guide holder flange 5c by a suitable means such as brazing and is connected to the guide holder flange 5c and the servo valve 7 by a link mechanism 17 including a middle section 17d. As a spring-receiving member 8 is employed a ring having a given thickness providing a cutout groove 82, in which the link mechanism 17 is bendably located.

The link mechanism 7 consists of three links 17a, 17b and 17c as shown in FIG. 15. The ends of the first link 17a are respectively connected to the end of the servo valve 7 and one side of the middle section 17d by a pin. The ends of the second link 17b are pivoted to the other end of the middle section 17d and a fulcrum of a flange 5c. The third link 17c has the lower end rotatively pivoted to the middle section 17d and the upper end rotatively pivoted to the flyweight 11 by a pin. The links 17a, 17b, and 17c may be a lever or a bar. The pivoting portion may employ a ball joint means. And, the links may be parallel links or may have forked at ends only.

The guide of the flyweight 11 may be a groove 51 formed extending radially in the flange 5c, as shown in FIGS. 14-A. This groove needs, if necessary, a cover 14a for the opening thereof. The embodiment shown in FIG. 10 employs the passage construction shown in FIG. 6. The embodiment shown in FIGS. 11, 12 and 14 employs the passage construction shown in FIGS. 7 to 9.

The motion transmission means 9 is not limited to the constructions as shown in FIGS. 2, 3, 10, 12, and 14. For example, as shown in FIGS. 16 and 17, this means 9 may comprise a curved projection 9b secured on the inclined portion 43 of the slide pulley 4 and a counterpart projection 9c located at the position corresponding to the curved projection 9b, either one of these projections 9b, 9c being formed to be forked and the other one being fitted more loosely to the forked groove as the slide pulley 4 goes in the axial direction.

Furthermore, various embodiments can be employed as far as satisfying the basic subject of the invention. FIG. 18 shows one example thereof. The embodiment shown in FIGS. 2 and 3 is designed to secure, on the outer peripheral surface of the rigid pulley 3, the pulley (timing pulley) L for an auxiliary machine such as a water pump requiring the number of revolutions given in proportion to that of the engine, by means of bolts. In substitution, the present embodiment is designed to locate the pulley L at the back of the rigid pulley 3 so a to position the rotating direction of the pulley L by means of a pin 3b and connect the inner side of the pulley L to the drive shaft D with a semi-circular key 1. This embodiment can simplify the construction of the rigid pulley 3 and substantially enlarge the power piston chamber.

Moreover, the embodiment shown in FIGS. 2 and 3 is designed to slide the boss 6b of the centrifugal force offset cover 6 along the outer surface of the head 10a of the mount bolt 10. Alternatively, the subjected embodiment is designed to have a reduced boss 6b, mount a cap 6c with a seal ring 15 to the boss, and close the rear section of the head. This embodiment has two advantages, that is, preventing oil leakage because of fixed sealing in place of sliding sealing as well as facilitating the making of the centrifugal force offset cover 6 and the assembly of several members such a the guide holder.

If necessary, a control valve can be provided on the oil supply passage 12 for automatically stopping oil supply when an abnormal condition occurs. FIGS. 18, 18-A, and 18-B show an embodiment thereof. In FIGS. 18 and 18-A, the control valve 18 is located at the tip of the supply passage 12, that is, the area where the distributing holes 120, 120 are branched. In FIG. 18-B, it is located in the upstream of a filter 25. The control valve 18 shown in FIG. 18 comprises a valve body 18a and a spring 18b made of a form memory alloy. The spring 18b is provided with a memory where thermal damage is caused in the speed variator belt H, for example, 130° C. When the engine oil is at low temperature, the spring 18b shrinks so as to allow the supply passage 12 to communicate with the distributing holes 120. When the engine oil exceeds the determined temperature, the spring 18 expands to close the supply passage 12. It results in stopping oil supply to the power piston chamber 5f, shifting the slide pulley 4 to a decelerating side, and lowering the belt pressure, thereby suppressing thermal damage applied to the speed variator belt H.

In FIG. 18-A, the control valve 18 is an electromagnetic valve including a coil 18c, an armature 18d, and a plunger 18e. The coil 18c is electrically connected to the control unit installed in the car. The control unit receives an oil level detecting signal, an oil temperature detecting signal, and a driven pulley r.p.m. detecting signal, and program-processes these signals so as to be conductive to the coil 18c when it detects abnormality such as oil leakage, oil heating, or damage on the driven pulley. The actuated coil serves to attract the armature 18d to close the supply passage as shown in FIG. 18-A.

In FIG. 18-B, the control valve 18 is a pressure control valve, for which a direct-acting relief valve providing, for example, a piston valve 18a and a spring 18b is used. In the normal state, an oil ejection port 181 is closed, but when the oil pressure is made larger than the set force of the spring 18b (for example, exceeding 1 kg/cm$^2$), the valve 18a is lifted in a manner to allow the oil to flow from the oil ejection port 181 into the radial holes 130. It results in reducing the amount of oil supplied to the power piston chamber 5f and thus lowering the heating value transmitted to the speed variator belt H.

OPERATION

The operation and function of this invention will be described with reference to FIGS. 2 and 3.

When the engine is not driven, the servo valve 7 is pushed to the right end (backward limit) by the force of the governor spring 24. The flyweight 11 is located at the position of "lift zero", that is, between the spring-receiving member 8 and the retainer 7b. Since the power piston 4a is pushed to the right by the power spring 20, the slide pulley 4 is retained at the closing limit side where the inclined portion 43 of the pulley 4 closes to the inclined portion 32 of the rigid pulley 3. At this time, the tension of the speed variator belt H allows the supply hole 400 of the power piston 4a to communicate with the control hole 70 of the servo valve 7 and the drain hole 401 to be closed by the servo valve end. Hence, the engine oil is supplied to the power piston chamber 5f through the supply passage of the mount bolt 10, the supply port 500, the supply hole 400, and the control hole 70.

Since the power piston chamber 5f has a large capacity defined by the inside of the slide pulley 4 and the inside of the guide holder flange 5c, it naturally has a large pressure area. Accordingly, the power piston chamber 5f has large power, that is, the large oil pressure applied by the power piston chamber 5f is a resultant force with the power spring 20. It therefore has large power enough to oppose to the strong force of the pulley driven spring 2c. When the engine is not driven, the centrifugal force offset cover 6 is located at the rear surface of the guide holder flange 5c since the slide pulley 4 is at the backward limit so as to hold small internal area.

When the engine starts from the foregoing state, the rotation torque of the drive shaft D is transmitted to the guide holder shaft 5a and the flange 5c through the bolt. The flange 5c has the pin 9a fitted to the hole 5g as a motion transmission means. The spring 21 serves to push the rear end of the pin 9a in a manner to force the tip slope surface 90 of the pin 9a to close to the slide pulley inclined portion 43. The pin 9a provides on the side projections 43a, 43a engaged therewith, so that the slide pulley 4 is rotated in synchronism with the drive shaft D together with the rigid pulley 3. This rotation is transmitted to the driven pulley B through the speed variator belt H, thereby rotating the fixed pulley 2a and the movable pulley 2b around the bolt 2. Thus, the auxiliary machines am1, am2 can be rotated by the auxiliary machine drive pulley b and the auxiliary machine belt J.

The rotation of the drive pulley A serves to allow the flyweight located in the power piston chamber 5f to move in the radial direction by the centrifugal force and apply the thrust to the retainer 7b for moving to the left. As a result, the communication between the supply hole 400 and the control valve 70 is interrupted, thereby stopping the supply of the engine oil to the power piston chamber 5f. This is the low speed balanced state as shown in FIG. 2. The slide pulley 4 is retained in position by balancing the resultant force of the oil pressure of the power piston chamber 5f and the force of the power spring 20, and the force of the spring 2c effected on the driven pulley B. Therefore, the pitch circle diameter of the speed variator belt on the drive pulley A becomes large, conversely, the pitch circle diameter of the gear belt on the driven pulley B becomes small, thereby obtaining a speed changing ratio of 1:1. It means that the number of revolutions of the drive shaft D is transmitted to auxiliary machines am1 and am2 at it is.

In the state as shown in FIG. 2, when the drive shaft D has a larger number of rotations than a given number and the centrifugal force applied to the flyweight 11 overcomes the force of the governor spring 24, the flyweight 11 moves along the curvature track surface of the spring-receiving member 8, thereby moving the servo valve 7 to the left hand (toward the reverse rigid pulley direction) along the power piston 4a through the retainer 7b. This movement opens the drain hole 401 having been closed by the cylinder wall corresponding to the end of the servo valve 7 so that the power piston chamber 5f is communicated with the ejection port 501. The engine oil stored in the power piston chamber 5f, therefore, flows into the drain chamber 5f located outside of the power piston 4a. The flown engine oil returns from the hole 300 provided on the boss 30 of the rigid pulley 3 to the oil pan K through the ejection passage 13 and the radial hole 130 provided on the drive shaft D.

The outflow of the engine oil lowers the pressure applied on the slide pulley 4. The tension of the speed variator belt H pushes the slide pulley 4 to the left hand, that is, in a manner to be opened. Following the movement of the servo valve 7, the power piston 4a and the slide pulley 4 moves to the position at which the drain hole 401 of the power piston 4a is closed again on the inner peripheral surface of the servo valve. This is the high speed balanced state as shown in FIG. 3. The pitch circle diameter of the speed variator belt H on the drive pulley A becomes minimum, conversely, the pitch circular diameter on the driven pulley B becomes maximum.

The servo valve 7 is axially positioned by balancing the centrifugal force applied on the flyweight 11 and the governor spring 24, and accordingly the engine oil is flown in or out of the power piston chamber 5f for moving the slide pulley 4. It means that the minimum driven pulley diameter (speed changing ratio 1:1) at the low speed engine drive is changed automatically, continuously and smoothly until the maximum diameter (for example, speed changing ratio 1:0.5). The auxiliary machines am1, am2 are, therefore, driven at the number of revolutions decreased in comparison with the engine high speed rotation.

If the flyweight 11 employs the tabular member as shown in FIGS. 10 to 13, when the engine stops, the force of the governor spring 24 serves to push the servo valve 7 to the right end (backward limit) and thus the flyweight connected with the link member 16 is made lower to nearby the lower end of the guide groove 51 formed in the flange inner wall 50. When the drive shaft D starts to rotate, since the guide groove 51 prevents the flyweight 11 from the longitudinal movement, the flyweight 11 is moved in the radial direction, that is, the height of the guide groove 51 by the centrifugal force. This movement causes the servo valve 7 to be tracted by the link member 16.

If the flyweight employs a column member as shown in FIGS. 14 and 15, when the engine stops, the flyweight 11 is pulled by the third link 17c in a manner to leave it "lift zero" within the cylindrical guide 14 as shown in the upper half of FIG. 14, thereby positioning the first and second links 17a, 17b and the middle section 17d essentially in a straight line. Then, when the engine starts to rotate and the centrifugal force applied to the flyweight 11 overcomes the force of the governor spring 24, the flyweight 11 is moved in the radial direction of the flange along the cylindrical guide 14. The movement of the flyweight 11 serves to pull the third link 17c and the middle section 17d, thereby rotating the second link 17b around a fulcrum of the flange 5c and pulling the first link 17a, so that the servo valve 7 is tracted to the left hand.

The centrifugal force offset cover 6 is integrally combined with the slide pulley 4, so that it is moved to the left hand (toward the reverse direction of the rigid pulley). At this time, a part of the engine oil flown out of the drain chamber 5h flows in the centrifugal force offset cover 6 through the communicating hole 503. As a result, the centrifugal force offset cover 6 is pushed to the left hand (in the reverse direction of the guide holder) so that the rotation oil pressure may not move slide pulley 4 accidentally to the closing side (right hand).

We claim:

1. A stepless speed variator of a belt type including a drive pulley A provided on a drive shaft D of an engine and a driven pulley B for an auxiliary machine communicating with said drive pulley A through a V-belt and for continuously changing diameters of pitch circles of both pulleys, comprising;
    said driven pulley B providing a fixed pulley 2a having an auxiliary machine drive pulley b and a movable pulley 2b to be pulled to said fixed pulley side by a spring 2c,
    said drive pulley A providing,
        I. a rigid pulley 2 secured on said drive shaft D,
        II. a mount bolt 10 coaxially connected to the drive shaft D,
        III. a guide holder 5 fitted to said mount bolt 10 and having a cylindrical shaft 5a to be rotated together with said mount bolt and a flange 5c formed on the end of said shaft 5a,
        IV. a slide pulley 4 to be axially moved by the flange 5c guiding the outer peripheral side and the rigid pulley 3 guiding the inner peripheral side thereof and to be rotated together with the rigid pulley 3 by a motion transmission means 9, V. a centrifugal force offset cover 56 located at the back of said guide holder flange 5c and to be moved together with said slide pulley 4, VI. said slide pulley being combined with a tube power piston 4a to be moved along said guide holder shaft 5a, said power piston 4a and slide pulley 4 being constantly pulled toward said rigid pulley 3 by a power spring 20, thereby forming a variable power piston chamber 5f defined by said power piston 4a, said slide pulley 4, and said guide holder flange 5c, VII. a supply passage 12 within the mount bolt 10 for an engine oil supplied through said drive shaft D and an ejection passage 13 provided on the outer periphery of the mount bolt for returning the engine oil from said power piston chamber 5f to said drive shaft D, VIII. said power piston 4a providing a cylindrical servo valve 7 for controlling conduction of the engine oil in or out of said power piston chamber 5f, said servo valve 7 being fitted to the outer periphery of said power piston 4a in such a manner as being relatively moved in the axial direction and being constantly pulled toward the rigid pulley by a governor spring 24, while said servo valve 7 being moved as opposed to said governor spring 24 depending on the displacement of a flyweight located in said power piston chamber 5f with the rotation of said drive shaft D, IX. said centrifugal force offset cover 6 communicating with said engine oil ejection passage 13 in the interior thereof in such a manner as, when said slide pulley 4 is moved, conducting the engine oil through said engine oil ejection passage 13 and preventing shutting of said slide pulley 4 by the rotation oil pressure.

2. The device claimed in claim 1 wherein said motion transmission means 9 is composed of a plurality of pins 9a and these pins 9a penetrate through holes 5g formed on said guide holder flange 5c in a manner to allow the end of each pin to come into contact with the inclined portion 43 of said slide pulley.

3. The device claimed in claim 2 wherein said motion transmission means 9 is composed of a plurality of pins 9a and these pins 9a axially-movably penetrate through holes 5g formed on said guide holder flange 5c in a manner to allow the end of each pin to come into contact with the inclined portion 43 of said slide pulley 4, and the other end of each pin is supported on said guide holder flange 5c through a spring 21.

4. The device claimed in claim 1 wherein said motion transmission means 9 is composed of a plurality of projections 9c secured on said guide holder flange at given intervals and counterpart projections 9b secured on the inclined portion 43 of said slide pulley, either ones of said both projections include grooves and the other projections are more deeply fitted to said grooves with the axial movement of the slide pulley 4.

5. The device claimed in claim 1 wherein said guide holder shaft 5 contains said mount bolt 10 fitted thereon and said mount bolt 10 is connected to said drive shaft D, thereby fastening said guide holder 5 between said rigid pulley 3 and said boss 30, and said centrifugal force offset cover 6 contains a curved boss 6b fitting to an expanded hole 5b formed on said guide holder shaft 5a.

6. The device claimed in claim 1 wherein the engine oil supply passage 12 of said mount bolt 10 has one end communicating with an oil passage d on the drive shaft side through a filter 25 and the other end extending in axial direction of said bolt to a distributing hole 120 opening to the outer peripheral surface of said bolt, while said guide hold shaft 5a includes a supply port 500 communicating with said distributing hole 120 the end of which communicates with an axially long groove 500a constantly communicating with a supply hole 400 penetrating toward the thickness of said power piston 40, said servo valve 7 provides at least one control hole 70 formed toward the thickness, said control hole 70 is positioned to interrupt communicating with a supply hole 400 of said power piston 4a in the balanced state of pressure, the engine oil ejection passage 13 on the outer peripheral surface of the mount bolt communicates with a drain chamber 5h outside of said power position chamber through a plurality of holes penetrating through the boss 30 of said rigid pulley 3, said guide holder shaft provides an ejection port 501 provided at the position shifted from said supply port 500 on the peripheral surface, said power piston 4a provides a drain hole 401 formed through the thickness in a manner to constantly communicate with said ejection port 501, said drain hole 401 is positioned to interrupt the communication with the cylinder wall of said servo valve 7 in the balanced state of pressures, and said ejection port 501 provides a communicating hole 503 formed to extend in the axial direction, said communicating hole 503 communicating with said centrifugal force offset cover 6.

7. The device claimed in claim 6 wherein each supply and ejection holes for engine oil are positioned on the peripheral surfaces of said guide shaft 5a, said power piston 4a, and said servo valve 7.

8. The device claimed in claim 1 wherein said flyweight 11 is composed of a plurality of balls and said balls are retained by a forked retainer 7b secured on the end of said servo valve in a manner to allow it to move along the inner curve of a cap-like member 8 extending from said guide holder flange.

9. The device claimed in claim 1 wherein said flyweight 11 is radially moved along the wall of said guide holder flange 5c by centrifugal force.

10. The device claimed in claim 9 wherein said flyweight 11 is composed of a tabular member and said tabular member is connected to said servo valve 7 by a link member to be moved in curve fashion.

11. The device claimed in claim 10 wherein said link member 16 to be moved in curve fashion is composed of a flexible material represented by a flexible wire or an inflexible link pre-bent in arc fashion.

12. The device claimed in claim 10 wherein said flyweight 11 is a column body and is linked to said servo valve 7 and guide holder flange 5c by a link mechanism 11 containing a middle section 17d.

13. The device claimed in claim 1 wherein said slide pulley 4 includes an inclined portion 43 connecting an outer cylinder portion 44 with an inner cylinder portion 42, the end of said inner cylinder portion 42 includes a wall 45 bent at right angles, the end wall 41 of said power piston 4a is in contact with this wall 45 via an O ring 22, and the pushing pressure given by said spring 24 serves to move said power piston 4a and slide pulley 4 in concert.

14. The device claimed in claim 1 further comprising a boss 6b bent to the inside of said centrifugal force offset cover 6, said boss 6b being slid along the outer surface of the head of said mount bolt 10.

15. The device claimed in claim 1 wherein the inner diameter side of said centrifugal force offset cover 6 is closed by a cap 6c.

16. The device claimed in claim 1 further comprising a control valve 18 for limiting oil supply when an abnormal condition occurs and located in said oil supply passage 12.

* * * * *